United States Patent Office 2,730,519
Patented Jan. 10, 1956

2,730,519

PRODUCTION OF CLEAR TRANSPARENT POLYMERS OF ISOBUTYLENE AND STYRENE

Robert F. Leary, Cranford, N. J., assignor to Esso Research and Engineering Company, a corporation of Delaware No Drawing. Application June 8, 1953,
Serial No. 360,365

1 Claim. (Cl. 260—88.1)

This invention relates to the production of valuable copolymers which are transparent when sheeted and is a continuation-in-part of Serial No. 136,392, filed December 31, 1949, now U. S. Patent No. 2,641,595.

For many specialty purposes, it is desirable to prepare clear transparent sheets of polymeric materials. This is fairly simple to do when polymerizing a single monomer but in many cases it is very difficult to obtain clear products when copolymerizing two or more monmers, as in copolymerizing styrene and isobutylene at low temperatures, e. g. —10° C. to—103° C., by a Friedel-Crafts catalyst, as disclosed in U. S. Patent 2,274,749. In general, outside of impurities, it has been found that this lack of clarity or cloudiness is due to two factors: the heterogeneity of the polymer with respect to composition and molecular weight and the residual catalyst remaining in the final product. Satisfactory methods are known for removing virtually all of the residual catalyst from the polymer but difficulty has been obtained in overcoming heterogeneity due to composition and molecular weight It has been established that the compositional heterogeneity is largely due to the fact that the compounds being copolymerized have different speeds of polymerization. For example, when a feed batch containing equal weights of styrene and isobutylene was polymerized with aluminum chloride catalyst, it was found that the first product that formed contained less than 35% by weight of styrene and the product obtained near the end of the reaction contained about 97% by weight of styrene.

Furthermore, the properties of a coplymer depend partly upon the ratio of the monomers in the final product. Thus, copolymers of isobutylene and styrene range from viscous liquids to hard resins, depending upon the ratio of the monomers in the copolymer and upon the molecular weight. For a given purpose, therefore, it is extremely desirable to be able to prepare a product containing a predetermined homogeneous ratio of monomers. Up to now this has not been possible when copolymerizing monomers which have different rates of copolymerization.

It has been proposed in U. S. Patent No. 2,100,900 issued November 30, 1937, to H. Fikentscher and J. Hengstenberg that substantially uniform products can be obtained by adding the compound having the higher speed of polymerization at about the rate at which it is used up. However, this method of obtaining an apparently uniform product does not guarantee that the product of any given time is a copolymer of the monomers in the specific ratio indicated. Instead the results must be an average value of a number of copolymers having different ratios of monomers. Also, this method of operation does not teach those skilled in the art how to produce a uniform product of a desired monomeric ratio. For example, it has been found that if the weight ratio of styrene to isobutylene is initially about 2:1 then the first product formed contains 50% by weight of styrene and 50% by weight of isobutylene. Therefore, in order to consistently obtain a product of this ratio, the weight ratio of the monomers in the polymerization mixture would have to be maintained constant, i. e. at 2:1, but this is difficult to do.

The above disadvantages of the prior methods are overcome and a substantially homogeneous clear transparent copolymer is obtained from a mixture of monomers having different speeds of polymerization by first separately introducing catalyst and feed, which may contain a diluent as well as comonomers in a definite ratio, into a reaction vessel until desired equilibrium mixture is obtained, continuously and separately adding feed of a constant monomeric ratio and catalyst to the equilibrium mixture, at such rates as to maintain a constant percent conversion to polymer, and rapidly agitating the mixture so that the reactants and catalyst are diluted and mixed into the main polymerization mixture before little, if any, polymerization occurs. Simultaneously, a sufficient volume of reactants plus polymer is removed continuously from the reactor to maintain the reactor at constant volume. It is important that the conversion be maintained in the reactor at less than 100%, usually less than 95%, and preferably less than 90%. If the reaction at any time goes to completion, i. e. 100%, in the reactor, there would be no monomers in the overflow and hence none in the reactor, so that if polymerization is taking place, it must be occurring before the feed is diluted to equilibrium conditions. On the other hand, if a constant conversion is maintained below 90 or 95%, then the concentration of monomers and polymer product in the reactor are all maintained constant by the continual equilibrium addition of feed and withdrawal of product, if agitation is sufficiently rapid. This constancy of reactant concentration substantially eliminates compositional heterogeneity, reduces molecular weight heterogeneity and produces a clear transparent product.

It is to be noted that the monomer ratio in the feed and that in the reactor under equilibrium conditions will not be the same. The reactor liquid will be richer than the feed in the monomer with the slower copolymerization rate. The ratio required in the feed in order to produce a desired ratio in the polymer is readily determined experimentally, however, since it is constant at a constant conversion.

Thus, the controlling conditions necessary for the process of this invention are: (1) constant monomer ratio in the feed; (2) essentially constant conversion; (3) dilution of the feed in the reactor to essentially equilibrium conditions before much polymerization takes place, by the use of rapid agitation and less than complete conversion; (4) constant reactor volume; and (5) continuous operation.

All types of continuous polymerization are not suitable for the above process. For example, a coil type reactor in which feed and catalyst are introduced into one end of a pipe and product withdrawn at the other end, is entirely unsuitable for the present process, because of the lack of end to end mixing and the consequential variation in polymerization conditions along the pipe.

The invention has been found particularly applicable to the copolymerization of isobutylene or other alkenes of 3–5 carbon atoms, and styrene or substituted styrenes having 1 to 2 substituent halogen atoms, e. g., chlorine, or lower alkyl, e. g ., methyl, ethyl, etc., groups, by the general process described in U. S. Patent No. 2,274,749. In general, the process is carried out in the presence of an inert solvent or diluent such as liquefied propane or butane or a lower alkyl halide such as methyl or ethyl chloride. The catalyst comprises a Friedel-Crafts metal halide, such as boron fluoride or aluminum chloride, or other halide disclosed by N. O. Calloway in his article on the "Friedel-Crafts Synthesis" appearing in Chemical Reviews, vol. 17, No. 3., page 375, preferably dissolved in a solvent which forms no complex with the halide and which is liquid at the reaction temperature such as ethyl or methyl chloride. The reaction temperature should be at least as low as —50° C., and may be as low as —103° C., or lower.

For best results, the feed monomer ratio should extend from 40% to 80% styrene by weight and the conversion from 25 to 90%, preferably from 35 to 85%.

The following examples illustrate the process of this invention:

Example 1

A feed consisting of 60 parts styrene, 40 parts isobutylene, and 186 parts of methyl chloride was polymerized in an ethylene jacketed 3:1 liter continuous overflow agitated reactor with a catalyst consisting of 0.25 g. aluminum chloride per 100 cc. methyl chloride. The feed and catalyst rates were such that the reactor contents were turned over in about ½ hour. At the start of the reaction, it is, of course, necessary to increase the conversion from zero to the desired percent conversion, so that the polymerization is not taking place under equilibrium conditions. As time goes on, however, the polymer made during this period is worked out of the system, and the conditions of the invention are established, so that clear, transparent polymer is made. This is illustrated by the following data on polymer precipitated from the reactor liquor with methanol, hot milled 15 minutes at 310° F., and molded into ¼" thick slabs.

| Period | Polymer Made During Run Hour | Percent Transmission of Light* | | Percent Conversion | Intr. Visc. |
|---|---|---|---|---|---|
| | | Reading 1 | Reading 2 | | |
| A | 1 | 40.0 | 40.0 | 23.3 | 1.32 |
| | 1 to 1.5 | 55.0 | 55.5 | 37.3 | 1.06 |
| | 1.5 to 2.0 | 80.5 | 80.0 | 40.5 | 0.96 |
| | 2.0 to 2.5 | 84.0 | 85.0 | 43.4 | 0.87 |
| B | 2.5 to 3.0 | 89.0 | 88.0 | 42.7 | 0.89 |
| | 3.0 to 3.5 | 90.0 | 87.0 | 41.3 | 0.86 |
| | 3.5 to 4.0 | 89.0 | 89.5 | 45.0 | 0.84 |
| | 4.0 to 4.5 | | | 49.0 | 0.82 |
| | 4.5 to 5.0 | | | 45.8 | 0.85 |
| Average | | | | 44.7 | 0.85 |

A=Starting up period.
B=Period of substantial equilibrium.
*=Diller colorimeter, white unfiltered light, Air=100% transmission.

Thus, the polymer was being made at about 45 per cent conversion average (±5%) during continuous operation, and had a styrene content (by refractive index) of 54.5 per cent, and an intrinsic viscosity of 0.85.

At the end of 5 hours, the continuous operation was stopped, and the polymer left in the reactor at that time was found to have an intrinsic viscosity of 0.87.

Example 2

A feed consisting of 60 parts styrene, 40 parts isobutylene and 300 parts methyl chloride was polymerized as described in Example 1 with a catalyst consisting of 0.25 g. aluminum chloride per 100 cc. methyl chloride. Polymer was produced at 44 per cent conversion, containing 48 per cent styrene, had an intrinsic viscosity of 1.22 and transmitted about 80% of incident light through a ¼" thick slab when tested as in Example 1.

Example 3

A feed consisting of 57.5 parts styrene, 42.5 parts isobutylene, and 300 parts of methyl chloride was polymerized, at —87° C., as in Examples 1 and 2 with a catalyst consisting of 0.1 aluminum chloride per 100 cc. methyl chloride. At the end of 4.25 hours' operation, polymer having an intrinsic viscosity of 1.15 was being produced at 49 per cent conversion, contained 45 per cent styrene, and transmitted 76 per cent of incident light through a ¼" specimen when measured as in Example 2.

Examples 4, 5, and 6

These three experiments were made, in general, like the copolymerizations of the previous examples, namely at a polymerization temperature between —90 and —100° C., using styrene and isobutylene as comonomers in the continuous agitated reactor, with a catalyst solution consisting of 0.25 gram of $AlCl_3$ per 100 cc. solution in methyl chloride. Lower amounts of a styrene were used in the feed than in the previous experiments. Also, there was some variation in concentration of monomers in the methyl chloride diluent, as indicated herebelow. In each case, the reaction was carried out continuously until conditions of substantial equilibrium and constant conversion were effected. Under these conditions, the following data were obtained:

| Ex. | Monomers | Feed, Percent Styrene | Run Length, Hours | Percent Conversion | Styrene in Polymer | Percent Light Transmission | Intrinsic Viscosity |
|---|---|---|---|---|---|---|---|
| 4 | 14 | 53.2 | 4.5 | 67 | 43.7 | 66.0 | 0.97 |
| 5 | 20 | 47.0 | 4.5 | 63 | 36.1 | 32.0 | 0.96 |
| 6 | 20 | 40.0 | 2.5 | 39 | 20.4 | 14.5 | 1.3 |

These data show that as the proportion of styrene in the feed is reduced (compared to that of isobutylene), the proportion of styrene entering the copolymer molecules becomes even still less, and it becomes increasingly more difficult to produce a polymerization product having a high per cent of light transmission. Furthermore, any polymer having a light transmission below about 60% is too opaque to be suitable for use where transparency is required.

The nature of the present invention having been thus fully set forth and specific examples of the same given, what is claimed as new and useful and desired to be secured by Letters Patent is:

In a process for copolymerizing a mixture of isobutylene and styrene at a temperature of about —80° C., to —100° C., in the presence of aluminum chloride dissolved in methyl chloride as solvent, the improvement which comprises maintaining a continuously agitated polymerizing mixture of said styrene and isobutylene in a constant concentration in 2 to 4 volumes of methyl chloride as solvent and at a constant volume, maintaining a substantially constant conversion level of said polymerizing mixture at about 40 to 80% conversion, continuously adding a mixture of 47 to 40% by weight of isobutylene and 53 to 60% by weight of styrene in a substantially fixed ratio relative to each other to said polymerizing mixture, simultaneously continuously removing isobutylene, styrene and a copolymerization product containing about 44 to 55% combined styrene and having an intrinsic viscosity of about 0.7 to 1.5 and a light transmission of at least 60% in ¼" molded layer from the polymerizing mixture, and adjusting the ratio of the total amount of isobutylene and styrene added to the mixture of isobutylene, styrene and product removed so that the concentration of isobutylene and styrene and product in the polymerizing mixture is maintained constant.

References Cited in the file of this patent

UNITED STATES PATENTS 2,641,595    Leary                June 9, 1953